(12) United States Patent
Rotari

(10) Patent No.: US 11,521,509 B2
(45) Date of Patent: *Dec. 6, 2022

(54) KEYBOARD FINGER GUIDE

(71) Applicant: Eugeniu Rotari, Orlando, FL (US)

(72) Inventor: Eugeniu Rotari, Orlando, FL (US)

( * ) Notice: Subject to any disclaimer, the term of this patent is extended or adjusted under 35 U.S.C. 154(b) by 75 days.

This patent is subject to a terminal disclaimer.

(21) Appl. No.: 16/804,797

(22) Filed: Feb. 28, 2020

(65) Prior Publication Data

US 2020/0202742 A1    Jun. 25, 2020

Related U.S. Application Data

(63) Continuation-in-part of application No. 15/984,188, filed on May 18, 2018, now Pat. No. 10,878,716.

(51) Int. Cl.
*G09B 13/04* (2006.01)
*G06F 3/02* (2006.01)

(52) U.S. Cl.
CPC ........... *G09B 13/04* (2013.01); *G06F 3/0224* (2013.01)

(58) Field of Classification Search
CPC ................................. G09B 13/00; G09B 13/04
USPC ............ 434/227–233; 400/714.715; D18/12, D18/12.2; D19/59, 62
See application file for complete search history.

(56) References Cited

U.S. PATENT DOCUMENTS

| | | | | |
|---|---|---|---|---|
| 229,386 | A | * 6/1880 | Costa | G06F 3/0202 400/715 |
| 502,685 | A | * 8/1893 | Terry | G06F 3/0202 400/715 |
| D22,971 | S | * 12/1893 | Terry | D18/12 |
| 903,031 | A | * 11/1908 | Diaz | G06F 3/0202 400/715 |
| 1,001,482 | A | * 8/1911 | Vidal | G06F 3/0202 400/715 |
| 1,008,591 | A | 11/1911 | Feakes | |
| 1,377,070 | A | 5/1921 | Ignacio | |
| 1,389,419 | A | * 8/1921 | Briggs | G09B 13/04 400/714 |
| 1,560,020 | A | 11/1925 | Curley | |
| 1,572,385 | A | * 2/1926 | Ellsworth | G09B 13/04 400/715 |
| 1,937,067 | A | 11/1933 | Parker | |
| 2,491,332 | A | 12/1949 | Potter | |
| 2,800,727 | A | 7/1957 | Potter | |
| 3,229,800 | A | 1/1966 | Niels | |
| 4,075,465 | A | 2/1978 | Funk et al. | |
| D300,040 | S | * 2/1989 | Dermody | 400/715 |

(Continued)

*Primary Examiner* — Kurt Fernstrom
(74) *Attorney, Agent, or Firm* — Jason T. Daniel, Esq.; Daniel Law Offices, P.A.

(57) ABSTRACT

A keyboard finger guide device includes an elongated divider this is positionable horizontally between two rows of a keyboard, and a plurality of curvilinear guides that are secured to the divider perpendicularly and are positionable vertically between a plurality of individual keys of the keyboard. The guides are constructed from a malleable and resilient material and can extend above the top surface of the keyboard keys to provide a constant guide for the first two fingers of a user's left and right hands in the typing position at rest. The guides can also extend level with the top surface of the keyboard keys at rest to selectively guide the first two fingers of a user's left and right hands while typing.

14 Claims, 3 Drawing Sheets

(56) References Cited

U.S. PATENT DOCUMENTS

| | | | | |
|---|---|---|---|---|
| 5,286,125 A | * | 2/1994 | DiGiosia | B41J 5/10 400/472 |
| D395,450 S | * | 6/1998 | Drumm | D14/454 |
| 6,644,975 B2 | * | 11/2003 | Heckmann, Jr. | G09B 13/02 434/227 |

* cited by examiner

KEYBOARD FINGER GUIDE

CROSS-REFERENCE TO RELATED APPLICATIONS

This application claims the benefit of copending U.S. application Ser. No. 15/984,188 filed on May 18, 2018, the contents of which are incorporated herein by reference.

TECHNICAL FIELD

The present invention relates generally to computer accessories, and more particularly to a finger guide for a keyboard.

BACKGROUND

The statements in this section merely provide background information related to the present disclosure and may not constitute prior art.

As technology becomes increasingly integrated to our everyday life, the need to type accurately has never been more important. Although most avid computer users are capable of typing fast and accurately in optimum conditions such as when the keyboard is on a flat level surface and ample lighting is available, the job of typing accurately becomes more difficult in less than optimum conditions and/or when the keyboard is out of direct sight as may occur if the user is wearing a virtual reality headset, for example.

For example, when working in low light conditions, such as at home or in a restaurant, for example, users who know how to properly type may find it more difficult to properly arrange their fingers on the keyboard. When this occurs, many mistakes are made, and the user must spend a significant amount of time correcting the errors.

Although there are many known keyboard guide devices which include rigid frames extending far above the keyboard to teach new users proper hand and finger placement, such devices are not ideal for experienced users who need a flexible guide that can aid in low light situations. Moreover, such devices are often not beneficial for those learning to type, as the raised frames are intended to bracket the users fingers and to restrict movement of the outer fingers.

In this regard, the inventor has discovered that a resilient guide for aligning the first two fingers, along with a clear visual indicator of proper hand placement achieves results superior to other known teaching products.

Accordingly, the present invention, directed to a keyboard finger placement guide differs from the conventional art in a number of aspects. The manner by which will become more apparent in the description which follows, particularly when read in conjunction with the accompanying drawings.

SUMMARY OF THE INVENTION

The present invention is directed to a keyboard finger guide device. One embodiment of the present invention can include an elongated divider this is positionable horizontally between two rows of a keyboard. A pair of curvilinear guides can be secured to the divider perpendicularly and are positionable vertically between a plurality of individual keys of the keyboard.

In one embodiment, the guides can be constructed from a malleable and resilient material and can extend above the top surface of the keyboard keys. The guides can function to provide a constant guide for the first two fingers of a user's left and right hands in the typing position at rest, to reinforce proper placement through constant positive tactile contact.

In one embodiment, the guides can be constructed from a malleable and resilient material and can extend level with the top surface of the keyboard keys at rest. The guides can function to selectively guide the first two fingers of a user's left and right hands while typing to reinforce proper placement through positive tactile contact.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
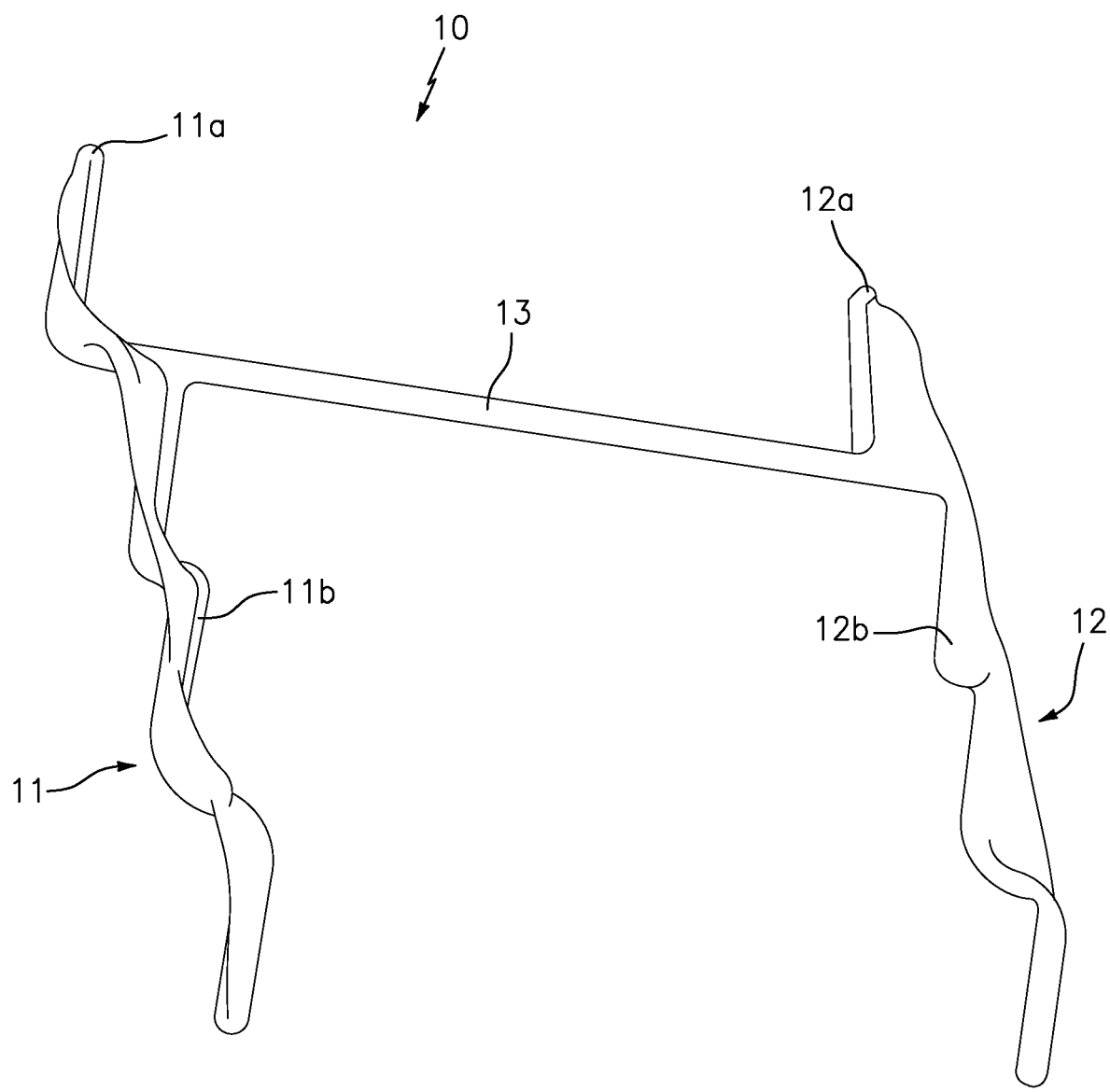
FIG. 1 is a perspective view of a keyboard finger guide that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described throughout this document, the term "keyboard" can include any panel having a series of keys for use with any device such as a desktop computer, laptop computer, and/or typewriter, among others for example.

As described herein, the term "removably secured" and derivatives thereof shall be used to describe a situation wherein two or more objects are joined together in a non-permanent manner so as to allow the same objects to be repeatedly joined and separated. This can be accomplished through the use of any number of commercially available connectors such as opposing strips of hook and loop material (i.e. Velcro®), magnets, and/or compression fittings such as clips or clamps, for example.

As described herein, the term "permanently secured" and derivatives thereof shall be used to describe a situation wherein two or more objects are joined together in a manner that is intended to prevent the same objects from being separated. Several nonlimiting examples include various adhesives such as glue or resin, welds, and/or through known manufacturing techniques, for example.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

FIGS. 1-4 illustrate various embodiments of a keyboard finger placement guide device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 2.

As shown in FIG. 1, one embodiment of the device 10 can include a pair of curvilinear guides 11 and 12 that are positioned parallel to each other and that are connected along the upper ends by an elongated divider 13. The divider 13 can include an elongated, generally planar member that can extend horizontally along a keyboard and can function to maintain the guides 11 and 12 in proper vertical alignment.

In the preferred embodiment, each of the guides 11 and 12 can be constructed from a malleable and resilient material, and can include a specific shape and size that is designed to be positioned between a series of vertically offset keys that are found on a standard keyboard. Additionally, each of the guides 11 and 12 can preferably include bright and/or neon colors, for example, that clearly distinguish the guides from a keyboard. Such a feature being beneficial to allow those learning to type to quickly see if their hands are in proper placement along the keyboard.

Figure 2:
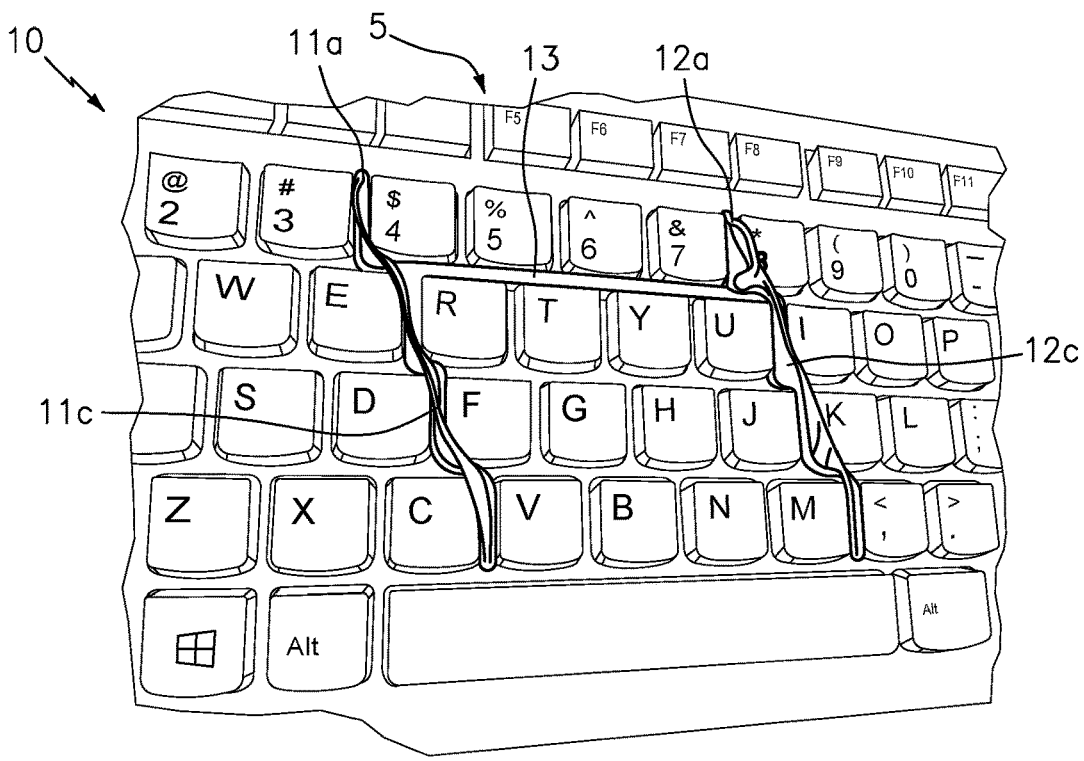
FIG. 2 is a perspective view of the keyboard finger guide on a keyboard, in accordance with one embodiment of the invention.

As shown at FIG. 2, one embodiment of the device 10 can be constructed so as to function with a standard QWERTY keyboard 5. In this regard, divider 13 can be positioned horizontally in the space between the number keys and the upper row of letter keys, the top end 11a of guide 11 can be positioned between the number "3" and "4" keys, and the top end 12a of guide 12 can be positioned between the number "7" and "8" keys. Each of the guides 11 and 12 can be designed to include a shape and size that is complementary to the shape and space between the keys of the keyboard, so as to occupy an entirety of this space.

Figure 3:
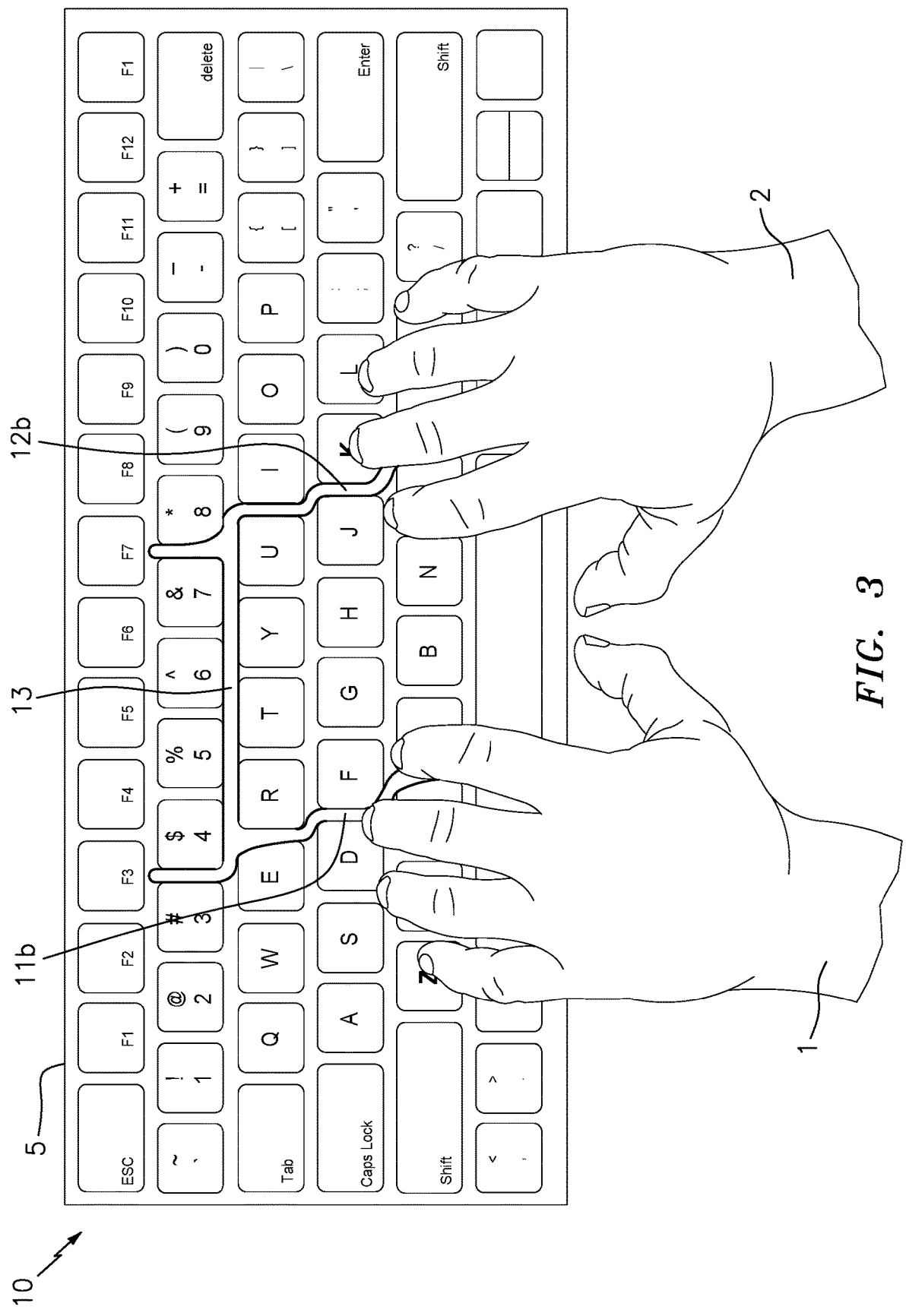
FIG. 3 is a perspective view of the keyboard finger guide in operation, in accordance with one embodiment of the invention.

As shown at FIG. 3, when so positioned, the middle section 11b of guide 11 can extend between the "F" and "D" keyboard keys, and that the middle section 12b of guide 12 can be positioned between the "J" and "K" keyboard keys. This placement is an important feature as these keys represent the resting position for the first two fingers (the index and middle fingers) of a user's left hand 1 and right hand 2, respectively so that a user can be provided with a tactile aid for physically aligning their hands and fingers properly on the keyboard.

In the illustrated embodiment, both of the guides 11 and 12 can include a height 11c and 12c, respectively that is greater than a height of the keyboard keys at rest (e.g., raised height"). Such a feature being particularly advantageous for users who are learning how to type on a keyboard proper finger placement through constant positive tactile contact with the raised surface of the guides. As such, students can be provided with a single guide surface for the two main typing fingers on each hand that automatically aligns the other fingers. Additionally, because the guides are raised above the keyboard, the user does not have to look at the keyboard to use the guides. According to some embodiments, illustrated, for example, in FIGS. 2 and 3, the guide 11 or 12 covers a portion of an upper surface of one or more keyboard keys. For example, guide 11 may cover a portion of upper surface of "C" keyboard key (shown in FIG. 2) and/or a portion of upper surface of "F" keyboard key (shown in FIG. 2) and/or a portion of upper surface of "E" keyboard key (shown in FIG. 3). For example, guide 12 may cover a portion of upper surface of "J" keyboard key (shown in FIG. 2).

Figure 4:
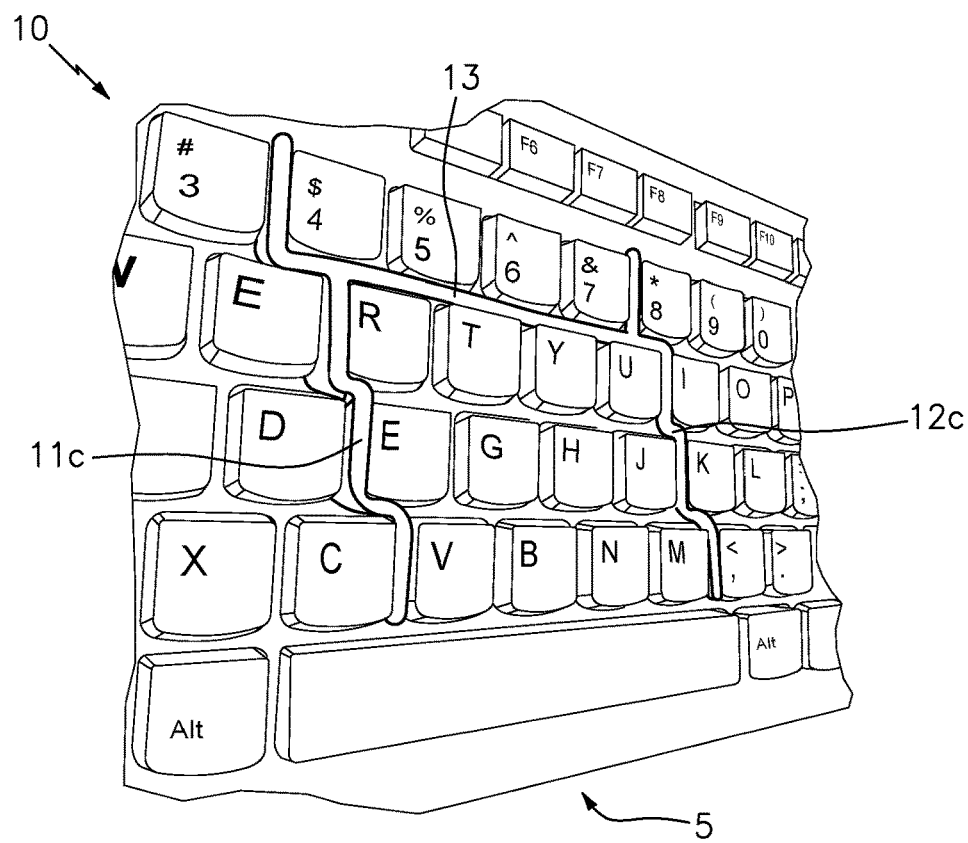
FIG. 4 is another perspective view of the keyboard finger guide on a keyboard, in accordance with one embodiment of the invention.

Although described above as extending above the keyboard keys, other embodiments are also contemplated. For example, FIG. 4 illustrates one embodiment of the device 10 wherein the height of the guides 11 and 12 are substantially level with the upper surface of the keyboard keys at rest (e.g., "level height"). In this regard, only when the user depresses keys adjacent to the guide(s) 11 or 12, will they be able to feel the presence of the guides. Such a feature being particularly beneficial for those with intermediate typing skills who no longer need the constant raised guide described above, but can benefit from subtle reinforcement of proper hand placement. According to some embodiments, illustrated, for example, in FIGS. 2 and 4, a portion of the guide 11 is configured to be positioned below upper surface of the keyboard keys at rest. According to some embodiments, illustrated, for example, in FIGS. 2 and 4, a portion of the guide 12 is configured to be positioned below upper surface of the keyboard keys at rest. According to some embodiments, illustrated, for example, in FIGS. 2 and 4, a portion of the elongated divider 13 is configured to be positioned below upper surface of the keyboard keys at rest.

In either instance, it is worth noting that the present embodiments do not include outer guides which act to restrict movement of the user's outer fingers (e.g., pinky fingers). This feature is specifically eliminated from the present embodiment to reinforce positive tactile guidance as opposed to negative/boundary guidance of the user's hands and fingers.

As noted above, one embodiment of the device 10 can be used with industry standard commercially available keyboard having individual keys that are 0.75"×0.75", and that utilize the QWERTY layout. When so constructed, the following dimensions are critical for ensuring proper use as described above.

In one embodiment, the device 10 can be constructed wherein the horizontal divider 13 includes a height of less than 2 mm, and a length of approximately 3.5 inches, so as to extend from the left side of the number "4" keyboard key to the left side of the number "8" keyboard key.

Curvilinear guides 11 and 12 can each include a length of approximately 3 inches, so as to be positionable between the keyboard keys as described above, and can include a raised height of approximately 5 mm, or a level height of approximately 2 mm, for example.

Additionally, because the device 10 is intended to be constantly engaged by a user's fingers, it is important that the guides 11 and 12 may be constructed from a malleable material that can bend and move with the movement of the user's fingers, while also having resilient qualities so as to remain between and/or to the proper placement between the keyboard keys as described above. Accordingly, in the preferred embodiment, the device 10 and/or guides 11 and 12 can be constructed from rubberized plastic, or other soft polymers, for example. Additionally, the device components may also be constructed to include luminescent properties and may be constructed from composite materials such as clear polymer filled with glitter or other such particles, for example.

Of course, other shapes, sizes, dimensions and/or construction materials are contemplated for keyboards having different shapes, sizes, languages (e.g., non-English alphabets) and/or arrangement of keys, such as the DVORAK layout, for example.

As described herein, one or more elements of the keyboard finger placement guide device 10 can be secured together utilizing any number of known attachment means such as, for example, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A guide device for a keyboard, said device comprising:
   a first guide member having a top end, a bottom end, a middle portion and a top surface;
   a second guide member having a top end, a bottom end, a middle portion and a top surface; and
   an elongated divider that extends between the middle portion of each of the first guide member and the second guide member,
   wherein the divider is configured to be positioned horizontally between two rows of keyboard keys, and each of the first and second guide members are configured to be positioned vertically between a plurality of individual keyboard keys;
   wherein a portion of the first guide is configured to be positioned below an upper surface of the keyboard keys;
   wherein a portion of the elongated divider is configured to be positioned below the upper surface of the keyboard keys.

2. The finger placement guide device of claim 1, wherein each of the guide members includes a curvilinear shape.

3. The finger placement guide of claim 2, wherein the curvilinear shape of each of the guide members is identical.

4. The finger placement guide of claim 1, wherein the top surface of each of the first and second guide members includes a height that is greater than a height of the individual keyboard keys.

5. The finger placement guide of claim 1, wherein the top surface of each of the first and second guide members includes a height that is equal to a height of the individual keyboard keys.

6. The finger placement guide of claim 1, wherein the divider and each of the first and second guide members include separation distances that are configured for use with a keyboard having a QWERTY layout.

7. The finger placement guide of claim 6, wherein the first guide member includes a shape and dimension that is configured to position the top end of the first guide member between a number-3 keyboard key and a number-4 keyboard key, and for positioning the bottom end of the first guide member between a letter-C keyboard key and a letter-V keyboard key.

8. The finger placement guide of claim 7, wherein the second guide member includes a shape and dimension that is configured to position the top end of the second guide member between a number-7 keyboard key and a number-8 keyboard key, and for positioning the bottom end of the first guide member between a letter-M keyboard key and a comma keyboard key.

9. The finger placement guide of claim 8, wherein the divider includes a first end that is connected to the first guide member, and a second end that is connected to the second guide member.

10. The finger placement guide of claim 9 wherein the divider includes a shape and dimension that is configured to position the first end of the divider beneath the number-4 keyboard key and the second end of the divider beneath the number-7 keyboard key.

11. The finger placement guide of claim 8, wherein each of the first and second guide members are constructed from a resilient material.

12. The finger placement guide of claim 8, wherein each of the first and second guide members are constructed from a malleable material.

13. The finger placement guide device of claim 1, wherein another portion of the first guide covers a portion of the upper surface of one of the keyboard keys.

14. The finger placement guide of claim 1, wherein the divider is permanently secured to each of the first and second guide members.

* * * * *